United States Patent
Mcleod

(10) Patent No.: US 6,438,240 B1
(45) Date of Patent: Aug. 20, 2002

(54) CIRCUIT TO IMPROVE TRANSDUCER SEPARATION IN HANDSFREE TELEPHONE

(75) Inventor: Rob Mcleod, Nepean (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 08/802,001

(22) Filed: Feb. 18, 1997

(51) Int. Cl.$^7$ .......................... A61F 11/06; H04B 15/00; H04M 1/00
(52) U.S. Cl. ..................... 381/71.7; 381/71.1; 381/94.9; 379/389
(58) Field of Search .................... 381/94.9, 71.7, 381/95; 379/388, 389, 390

(56) References Cited

U.S. PATENT DOCUMENTS

| | | | | |
|---|---|---|---|---|
| 4,442,323 A | * | 4/1984 | Yoshida et al. | 381/94.9 |
| 5,251,263 A | * | 10/1993 | Andrea et al. | 381/71.7 |
| 5,323,458 A | * | 6/1994 | Park et al. | 379/389 |
| 5,748,725 A | * | 5/1998 | Kubo | 379/387 |
| 5,787,165 A | * | 7/1998 | Lilja et al. | 379/390 |
| 5,825,897 A | * | 10/1998 | Andrea et al. | 381/71.7 |
| 6,108,415 A | * | 8/2000 | Andrea | 379/433 |

FOREIGN PATENT DOCUMENTS

| | | |
|---|---|---|
| EP | 613318 A1 | 8/1994 |
| GB | 563595 | 8/1944 |
| GB | 589031 | 1/1961 |
| WO | WO96/15541 | 5/1996 |

* cited by examiner

*Primary Examiner*—Forester W. Isen
*Assistant Examiner*—Laura A. Grier
(74) *Attorney, Agent, or Firm*—Beyer Weaver & Thomas LLP

(57) ABSTRACT

In a device having a sound source within an enclosure and a first microphone for picking up sounds outside the enclosure, a system for improving acoustic separation between the sound source and first microphone comprising an additional microphone located approximately equidistant from the sound as the first microphone for picking up sounds within the enclosure, and a circuit connected to the first microphone and the additional microphone for subtracting the sounds within the enclosure from the sounds outside the enclosure.

15 Claims, 1 Drawing Sheet

CIRCUIT TO IMPROVE TRANSDUCER SEPARATION IN HANDSFREE TELEPHONE

FIELD OF THE INVENTION

The present invention relates in general to devices incorporating a microphone and a sound or noise source in a single enclosure, such as handsfree or speaker phone systems, telephones, and more particularly to a circuit for improved separation between microphone and speaker.

BACKGROUND OF THE INVENTION

It is a requirement of a handsfree or speaker phone design to provide sufficient acoustic separation between the microphone and the speaker. For systems where the microphone and speaker are to be in the same enclosure this requirement can present a challenge. This is a problem for both half-duplex and full-duplex systems, where the acoustic coupling of the speaker output to the microphone input must be minimized to maintain stability in the system.

One component of this coupling is mechanical (i.e. through the structure of the enclosure). The other component is transmitted via air. This coupling is usually greater at or about the resonance frequency of the speaker.

Much acoustic, industrial and mechanical design effort can be expended in design of the enclosure in order to minimize the separation, but this does not usually occur because of cost and the limited time within which to supply a product to market. Sometimes the acoustic aspect of an enclosure are dealt with after other aspects of the enclosure are finalized, thus reducing the opportunity to minimize coupling.

The use of unidirectional microphones can reduce coupling, but it is difficult to design unidirectional microphones into a telephone type of enclosure because they require the sound to be present at the front and back of the microphone. Also, a unidirectional microphone restricts the user to one position in front of the microphone.

It is an object of an aspect of the present invention to provide a simple and inexpensive means for providing improved separation between the speaker and microphone in a handsfree or speaker phone system where both transducers are located in the same enclosure.

SUMMARY OF THE INVENTION

According to the present invention, improved acoustic separation is provided in an handsfree or speaker phone enclosure by means of providing a second inexpensive omnidirectional microphone (referred to herein as the speaker microphone) which is placed inside the enclosure to primarily pick up sound from the speaker, and a circuit for subtracting this sound from the sound picked up by the voice microphone which is positioned to pick up sound occurring outside of the enclosure.

BRIEF INTRODUCTION TO THE DRAWINGS

Figure 1:
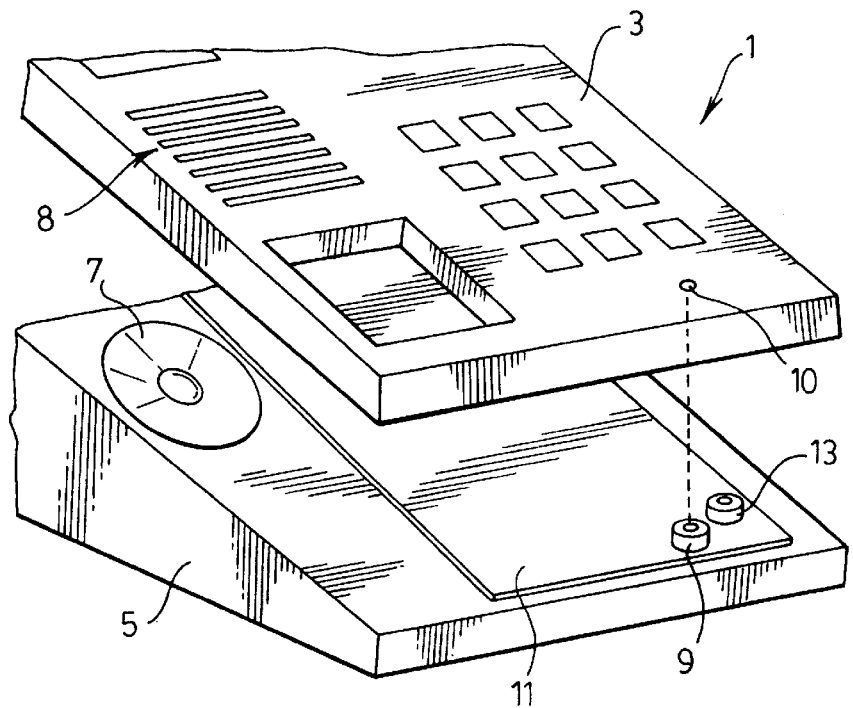
Figure 2:
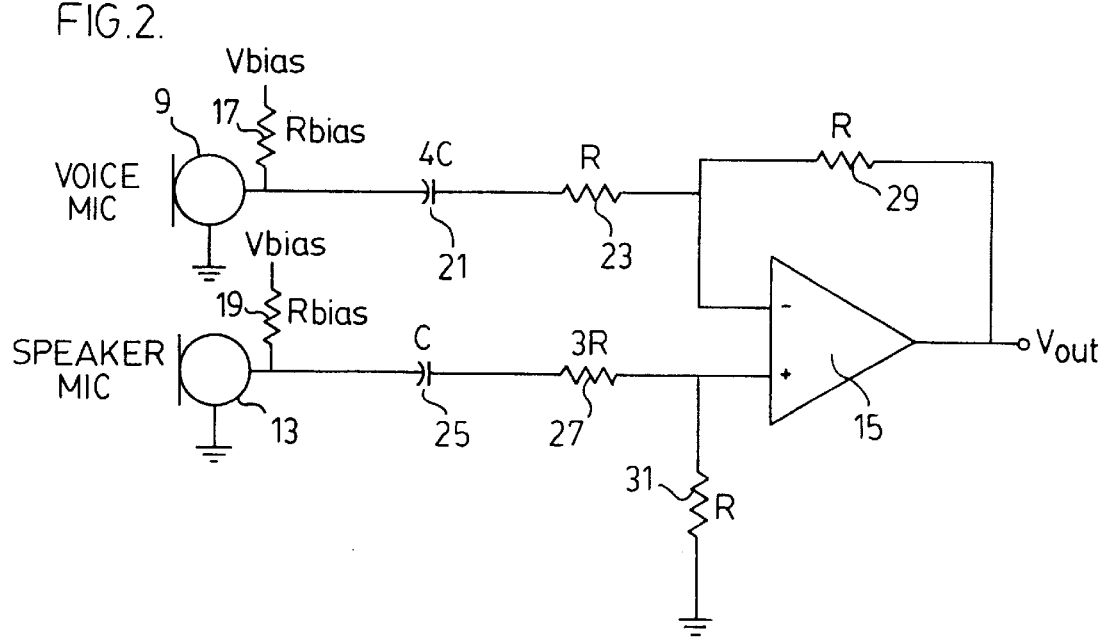

A detailed description of the preferred embodiment is provided herein below, with reference to the following drawings, in which:

FIG. 1 shows placement of a speaker microphone within a handsfree telephone set relative to the speaker and the voice microphone, according to an aspect of the invention; and FIG. 2 is a schematic diagram of a circuit for subtracting the sound picked up by the speaker microphone from the sound picked up by the voice microphone.

DETAILED DESCRIPTION OF THE PREFERRED EMBODIMENT

Turning to FIG. 1, a handsfree telephone set enclosure 1 is shown comprising a plastic cover 3 mounted to a plastic base 5. A speaker 7 is provided within the enclosure 1 for communicating sound to a user through a grill 8 in the plastic cover 3. To facilitate handsfree telephone communications in conjunction with the speaker 7, a voice microphone 9 is provided in the enclosure 1 for picking up sounds via an aperture 10 in the plastic cover 3. A printed circuit board 11 is provided in the base 5 for housing the microphone 9 and additional circuitry required for operation of the telephone.

According to the present invention, a speaker microphone 13 is inside the enclosure 1 for picking up the sound emitted by the speaker 7. The enclosure 1 significantly attenuates sounds from outside of the enclosure, such that the sounds picked up by the speaker microphone 13 may be subtracted from the sounds picked up by the voice microphone 9 which picks up sounds from outside of the enclosure, including sounds emitted by the speaker 7. As shown in FIG. 1, the microphones 9 and 13 are positioned so as to be equidistant from the speaker 7, and are mechanically connected to the enclosure 1 in a similar fashion. Preferably, the microphones 9 and 13 are the same model of microphone but need not be perfectly matched, provided that the sounds from speaker 7 are picked up by both microphones 9 and 13 substantially in phase.

A subtracting circuit is illustrated in FIG. 2, according to one embodiment of the present invention. The subtracting circuit is preferably designed for optimum performance in the frequency band in which the voice microphone 9 has maximum coupling to speaker 7 (i.e. typically a band around the resonance frequency of speaker 7). Each of the voice microphone and speaker microphone 13 are connected to a respective input of an operational amplifier 15 via pull-up resistors 17 and 19, each having a predetermined resistance (Rbias) and connected to a source of bias voltage (Vbias). Voice microphone 9 is connected to an inverting input of amplifier 15 via a series connection of capacitor 21 and resistor 23. Speaker microphone 13 is connected to a non-inverting input of amplifier 15 via a series connection of capacitor 25 and resistor 27. A feedback resistor 29 connects the output of amplifier 15 to the inverting input thereof, and a resistor 31 connects the non-inverting input of amplifier 15 to ground.

The gains and poles for the signal paths in the circuit embodiment of FIG. 2 are useful for a situation where the microphone outputs are in phase and the output of speaker microphone 13 is twice that of voice microphone 9. Specifically, Each of resistors 23, 29 and 31 has resistance "R", capacitor 25 has a capacitance of "C" and capacitor 21 has a capacitance of "4C", while resistor 27 has a resistance of "3R". The gain of the voice microphone 9 is $-R/R=1$, while the gain of the speaker microphone 13 is $R/(R+3R) \times (1+R/R)=\frac{1}{2}$. Since the frequency response is the same for both microphones, in-phase signals the speaker sounds picked up by voice microphone 9 are canceled by the speaker sounds picked up by the speaker microphone 13, leaving only the desired voice sounds at the output of the circuit (Vout).

Testing of the system according to the present invention has resulted in measured cancellation of 20dB with matched microphones and 12 dB with 2.5 dB mismatch between the microphones 9 and 13.

Alternatives and modifications of the invention are possible. All such embodiments and modifications are believed to be within the sphere and scope of the invention as set forth in the claims appended hereto. For example, the principles of the present invention may be implemented in digital form (e.g. via a digital signal processor (DSP)). Moreover, it is contemplated that the principles of the invention may be employed in any device containing a microphone and a sound or noise source within a single enclosure, such as video conferencing systems, cellular hands free devices and portable tape machines. In the case of a tape machine, the source is noise and vibration from the tape drive, whereas video conferencing and cellular handsfree phones are applications of the speaker phone technology discussed in connection with the preferred embodiment.

I claim:

1. In a device having a sound source within an enclosure and a first microphone for picking up sounds outside said enclosure, a system for improving acoustic separation between said sound source and said first microphone, comprising an additional microphone located approximately equidistant from said sound source as said first microphone for picking up sounds within said enclosure due to said sound source, and a circuit connected to said first microphone and said additional microphone for subtracting said sounds within said enclosure from said sounds outside said enclosure, wherein said enclosure has an opening directly corresponding to said first microphone but does not have an opening directly corresponding to said additional microphone, and wherein said additional microphone is separate and apart from said first microphone.

2. A system of claim 1, wherein said circuit is characterized by an optimized frequency response in a band around the resonance frequency of said sound source.

3. A system of claim 1, wherein said circuit includes an amplifier for amplifying said sounds outside said enclosure by a first gain and for amplifying said sounds inside said enclosure by a second gain, wherein said first gain and said second gain are chosen such that sound from said sound source is canceled by said circuit.

4. A system of claim 1 wherein said device is a speaker phone, said first microphone is a voice microphone, said sound source is a speaker and said additional microphone is acoustically matched to said voice microphone.

5. A system of claim 2 wherein said device is a speaker phone, said first microphone is a voice microphone, said sound source is a speaker and said additional microphone is acoustically matched to said voice microphone.

6. A system of claim 3 wherein said device is a speaker phone, said first microphone is a voice microphone, said sound source is a speaker and said additional microphone is acoustically matched to said voice microphone.

7. A speakerphone apparatus having improved acoustic separation between a speaker and a microphone, comprising:
    a speaker within a housing, the housing having an opening adjacent said speaker;
    a speaker microphone within the housing to detect sound internal to the housing due to said speaker's output, the housing not having an opening directly corresponding to said speaker microphone;
    a voice microphone within the housing but receiving sound external to the housing via an opening in the housing adjacent said voice microphone, said voice microphone being separate and apart from said speaker microphone; and
    a subtraction circuit coupled to said voice microphone and said speaker microphone, said subtraction circuit subtracts the sound internal to the housing detected by sad speaker microphone from the sound external to the housing detected by said voice microphone.

8. A speakerphone apparatus as recited in claim 7, wherein said speaker microphone and said voice microphone are positioned within the housing approximately equidistant from said speaker.

9. A speakerphone apparatus as recited in claim 7, wherein sound emitted from said speaker is detected by said speaker microphone and said voice microphone substantially in phase.

10. A speakerphone apparatus as recited in claim 7, wherein said subtraction circuit comprises:
    an amplifier for amplifying sound from said speaker microphone by a first gain and for amplifying sound from said voice microphone by a second gain, the first gain being less than the second gain.

11. A speakerphone apparatus as recited in claim 10, wherein sound emitted from said speaker is detected by said speaker microphone and said voice microphone substantially in phase.

12. A speakerphone apparatus as recited in claim 7, wherein said speaker microphone and said voice microphone are acoustically matched.

13. A speakerphone apparatus as recited in claim 7, wherein said subtraction circuit has an optimized frequency response in a band around the resonance frequency of said speaker.

14. A speakerphone apparatus as recited in claim 7, wherein said speaker microphone and said voice microphone are acoustically isolated by the housing.

15. A system of claim 1 wherein said first microphone and said additional microphone are acoustically isolated.

* * * * *